(12) United States Patent
Xiao et al.

(10) Patent No.: US 10,705,343 B2
(45) Date of Patent: Jul. 7, 2020

(54) HEAD MOUNTED DISPLAY APPARATUS AND IMAGE GENERATING METHOD

(71) Applicant: HTC Corporation, Taoyuan (TW)

(72) Inventors: Bo-Wen Xiao, Taoyuan (TW); Fu-Cheng Fan, Taoyuan (TW); Hsiu-An Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/191,440

(22) Filed: Nov. 15, 2018

(65) Prior Publication Data
US 2019/0361239 A1    Nov. 28, 2019

Related U.S. Application Data

(60) Provisional application No. 62/674,637, filed on May 22, 2018.

(51) Int. Cl.
*G02B 27/01*    (2006.01)
*G06T 11/00*    (2006.01)

(52) U.S. Cl.
CPC .......... *G02B 27/0172* (2013.01); *G06T 11/00* (2013.01); *G02B 2027/0118* (2013.01); *G02B 2027/0123* (2013.01)

(58) Field of Classification Search
CPC ........ G02B 27/0172; G02B 2027/0123; G02B 2027/0118; G02B 2027/0178; G02B 27/01; G02B 2027/0138; G02B 2006/12145; G02B 6/3518; G02B 26/101; G02B 27/283; G02B 13/16; G06T 11/00
See application file for complete search history.

(56) References Cited

U.S. PATENT DOCUMENTS

2005/0093796 A1 *  5/2005  Fergason ............. G02B 5/3083
                                                         345/88
2018/0031838 A1 *  2/2018  Browne ................. G02B 26/04

FOREIGN PATENT DOCUMENTS

EP            2535760          12/2012

OTHER PUBLICATIONS

"Search Report of Europe Counterpart Application", dated Jul. 31, 2019, p. 1-p. 9.

\* cited by examiner

*Primary Examiner* — Xilin Guo
(74) *Attorney, Agent, or Firm* — JCIPRNET

(57) ABSTRACT

A head mounted display (HMD) and an image generating method thereof are provided. The HMD includes a display device, an optical converter, an optical shutter and an optical engine. The display device receives an AR image and/or an external image, and transmits a display image along a projection direction. The optical converter receives the display image and adjusts an output angle to project an output image to a target area. The optical shutter opens a transmission path for the external image to the display device during a first time period, and inhibits the transmission path during a second time period, where the first time period is longer than the second time period. A first luminance of the AR image provided by the optical engine in the first time period is lower than a second luminance of the AR image provided by the optical engine in the second time period.

13 Claims, 3 Drawing Sheets

HEAD MOUNTED DISPLAY APPARATUS AND IMAGE GENERATING METHOD

CROSS-REFERENCE TO RELATED APPLICATION

This application claims the priority benefit of U.S. provisional application Ser. No. 62/674,637, filed on May 22, 2018. The entirety of the above-mentioned patent application is hereby incorporated by reference herein and made a part of this specification.

BACKGROUND

Technical Field

The invention relates to a head mounted display apparatus and an image generating method thereof, and particularly relates to a head mounted display apparatus adapted to enhance a real image penetration brightness and an image generating method thereof.

Description of Related Art

Along with advancement of display technology, head mounted display apparatus has become a popular display device.

In order to display high quality augmented reality images, the head mounted display apparatus is required to receive external real images and augmented reality images generated internally, and combine the real images with the augmented reality images to produce high quality display images. However, under the premise of balancing a penetration brightness of the real images and a brightness of the augmented reality images, how to adjust a switching mode and a switching frequency of optical components in the head mounted display apparatus has become an important issue for designers in the field.

SUMMARY

The invention is directed to a head mounted display apparatus and an image generating method thereof, which are adapted to enhance a penetration brightness of a real image.

The invention provides a head mounted display apparatus including a display, an optical converter, an optical shutter and an optical engine. The display receives an augmented reality image and/or an external image, and sends a display image along a projection direction. The optical converter is disposed at a first side of the display, and receives the display image and changes an emitting angle of the display image to send an output image to a target region. The optical shutter is disposed at a second side of the display, and is configured to shield a transmission path between the external image and the display. The optical engine sends the augmented reality image to the display. The optical shutter opens the transmission path during a first time interval, and shields the transmission path during a second time interval. The first time interval is longer than the second time interval. A first brightness of the augmented reality image provided by the optical engine during the first time interval is smaller than a second brightness of the augmented reality image provided by the optical engine during the second time interval.

The invention provides an image generating method adapted to a head mounted display apparatus. The image generating method includes: providing a display to receive an augmented reality image and/or an external image, and sending a display image along a projection direction; providing an optical converter to receive the display image and change an emitting angle of the display image to send an output image to a target region; providing an optical shutter to open a transmission path between the external image and the display during a first time interval, and shield the transmission path during a second time interval, where the first time interval is longer than the second time interval; and providing an optical engine to provide the augmented reality image with a first brightness during the first time interval, and provide the augmented reality image with a second brightness during the second time interval, herein the first brightness is smaller than the second brightness.

Based on the above description, by adjusting a time ratio of an opening operation and a shielding operation of the optical shutter, an incident time of the real image (the external image) is increased, and under a short operation time of the optical shutter, the optical engine provides the augmented reality image with high brightness. In this way, besides that the brightness of the augmented reality image is maintained, the penetration brightness of the real image is also enhanced, which improves the display quality of the head mounted display apparatus.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
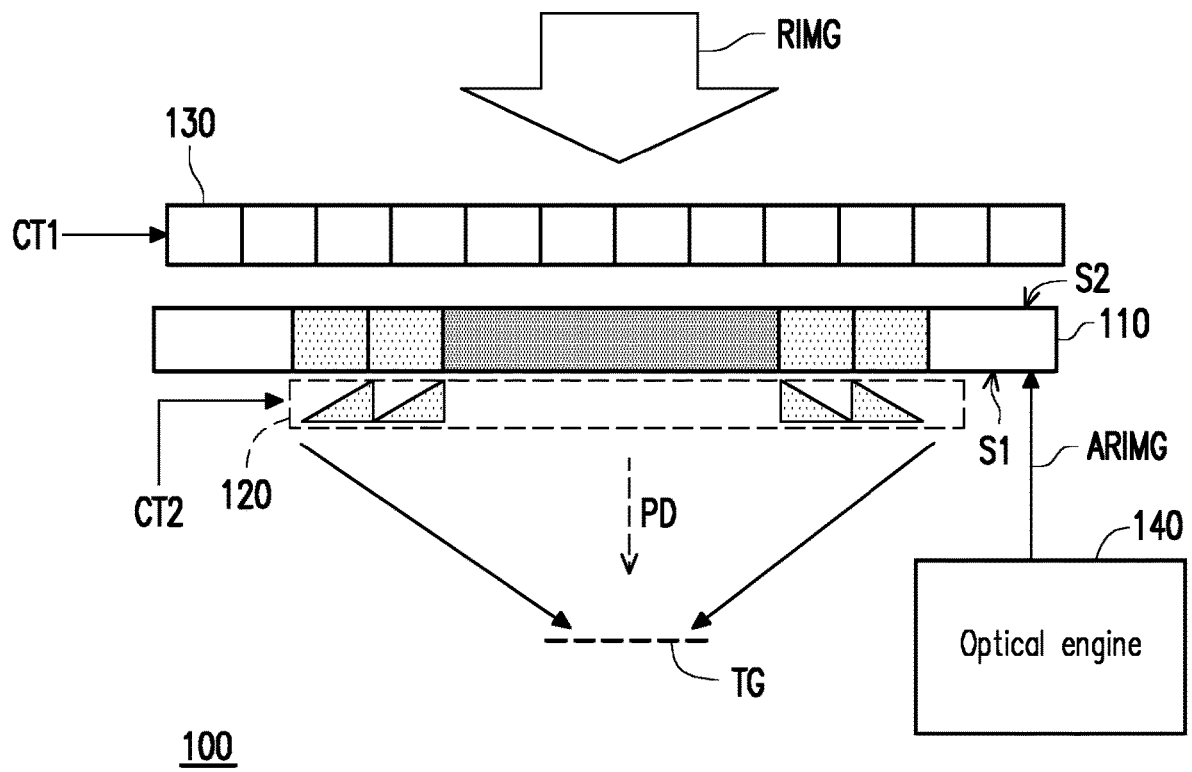
FIG. 1 is a schematic diagram of a head mounted display apparatus according to an embodiment of the invention.

Referring to FIG. 1, FIG. 1 is a schematic diagram of a head mounted display apparatus according to an embodiment of the invention. The head mounted display apparatus 100 includes a display 110, an optical converter 120, an optical shutter 130 and an optical engine 140. The display 110 receives an augmented reality image ARIMG and/or an external image RIMG, and sends a display image to a target region TG along a projection direction PD. The display 110 may combine the augmented reality image ARIMG and the external image RIMG to generate the display image, and sends the display image to the target region TG. Alternatively, the display 110 may generate the display image only according to the augmented reality image ARIMG, and send the display image to the target region TG. The target region TG corresponds to an eye position of a user of the head mounted display 100. The external image RIMG is a real image transmitted to the head mounted display apparatus 100.

Moreover, in the embodiment, the optical converter 120 is disposed at a first side of the display 110, and is located between the display 110 and the target region TG. The optical converter 120 receives the display image projected by the display 110, and changes an emitting angle of the display image to send an output image to the target region TG. Through a deflection effect of an image transmission angle provided by the optical converter 120, the display image with a larger display range may be effectively projected to the user's eyes, and user's field of vision is expanded.

In the embodiment, the optical converter 120 may determine an emitting angle of the display image according to an electric signal CT2, and send an output image to the target region TG accordingly.

On the other hand, the optical shutter 130 is disposed at a second side S2 of the display 110, and is located on a path that the display 110 receives the external image RIMG. The optical shutter 130 is configured to shield a transmission path between the external image RIMG and the display 110. When the optical shutter 130 is activated, the transmission path between the external image RIMG and the display 110 is shielded, and the display 110 cannot receive the external image RIMG. Comparatively, when the optical shutter 130 is not activated, the transmission path between the external image RIMG and the display 110 is opened, and the display 110 may receive the external image RIMG.

In the embodiment, the optical shutter 130 may be activated or not activated according to an electric signal CT1.

The optical engine 140 is coupled to the display 110, and is configured to send the augmented reality image ARIMG to the display 110. In the embodiment, a brightness of the augmented reality image ARIMG sent by the optical engine 140 is adjustable. The brightness of the augmented reality image ARIMG sent by the optical engine 140 may be adjusted according to whether the optical shutter 130 is activated. To be specific, in the embodiment, when the optical shutter 130 is not activated, the augmented reality image ARIMG sent by the optical engine 140 may have a first brightness, and when the optical shutter 130 is activated, the augmented reality image ARIMG sent by the optical engine 140 may have a second brightness, and the first brightness is smaller than the second brightness.

Figure 2:
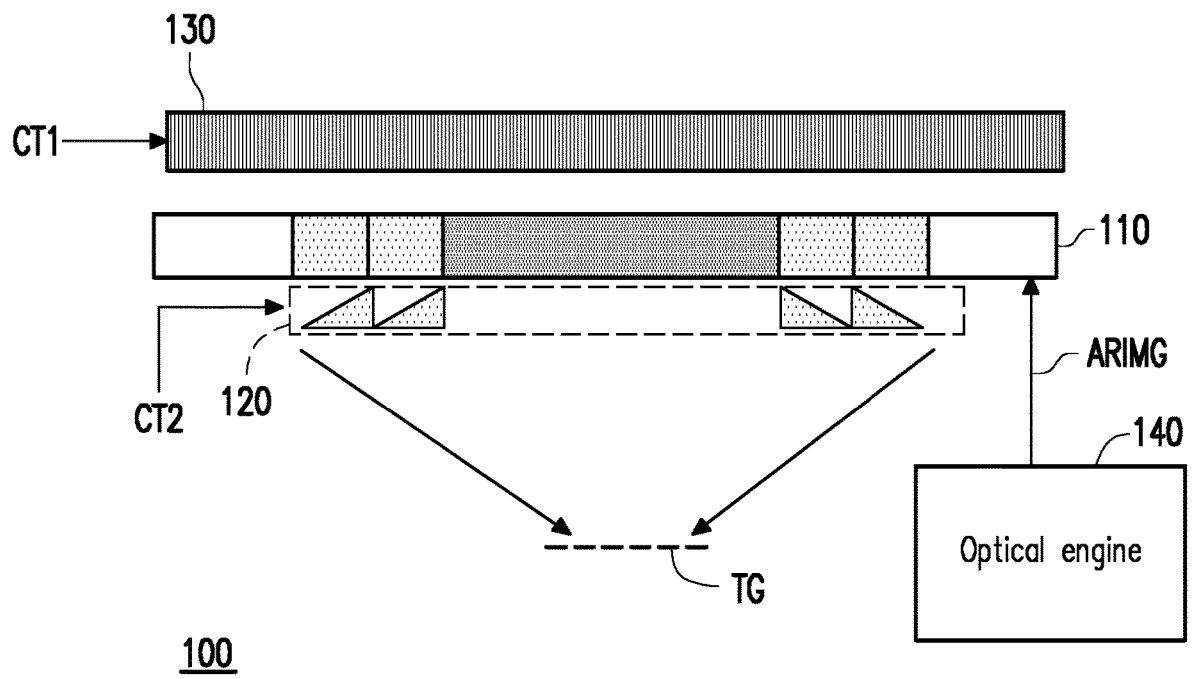
FIG. 2 is a schematic diagram of an operation method of a head mounted display apparatus according to an embodiment of the invention.

Regarding the optical shutter 130, in the embodiment of the invention, FIG. 2 is a schematic diagram of an operation method of the head mounted display apparatus according to an embodiment of the invention, in which the optical shutter 130 is not activated during a first time interval, and the transmission path between the external image RIMG and the display 110 is opened. Moreover, during a second time interval, the optical shutter 130 is activated to shield the transmission path between the external image RIMG and the display 110, where the first time interval is greater than the second time interval.

Further, in the embodiment of the invention, one frame period of the display 110 may be divided into a plurality of (N+1) sub-frame periods. The first time interval during which the optical shutter 130 is not activated may have N sub-frame periods, and the second time interval during which the optical shutter 130 is activated may have only one sub-frame period. Correspondingly, the first brightness provided by the optical engine 140 during the first time interval may be 1/N of the second brightness provided by the optical engine during the second time interval.

Taking one frame period of 16.6 ms as an example (a frame rate is 60 Hz), a time for the display 110 producing the display image according to the external image RIMG and the augmented reality image ARIMG with the first brightness is N/(N+1) ×16.6 ms. And a time for the display 110 producing the display image according to the augmented reality image ARIMG with the second brightness is 1/(N+1)×16.6 ms. According to the above description, it is known that through the longer first time interval, a penetration brightness of the external image RIMG in the display image may be enhanced. Moreover, by providing the augmented reality image ARIMG with relatively high brightness during the second time interval, the brightness of the augmented reality image ARIMG in the display image is maintained without reducing.

Figure 3:
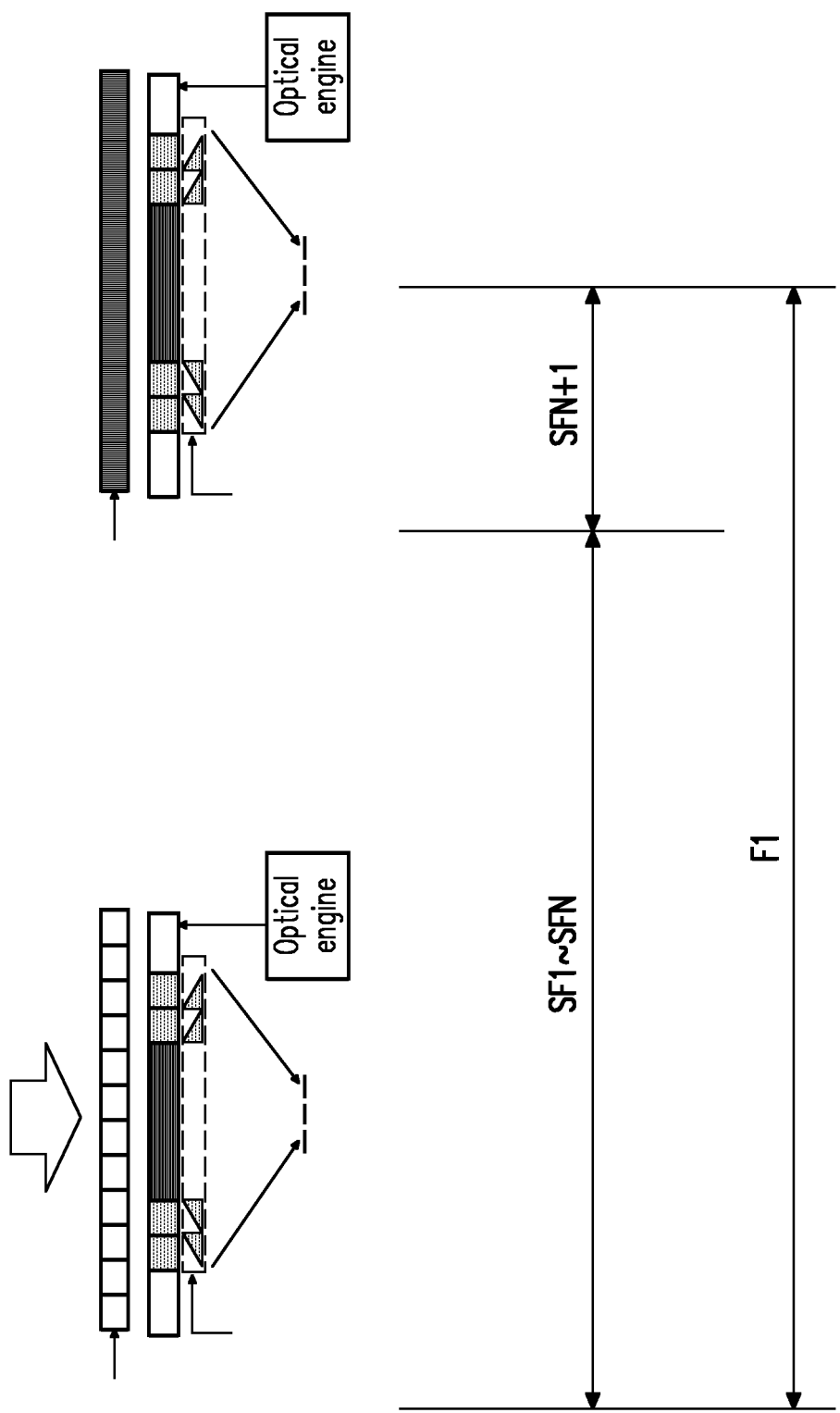
FIG. 3 is an operation timing diagram of a head mounted display apparatus according to an embodiment of the invention.

Referring to FIG. 3, FIG. 3 is an operation timing diagram of the head mounted display apparatus according to an embodiment of the invention. In FIG. 3, in sub-frame periods SF1-SFN, the head mounted display apparatus works in a state shown in FIG. 1, where the optical shutter is not activated, and works in the first time interval. Comparatively, in a sub-frame period SFN+1, the head mounted display apparatus works in a state shown in FIG. 2, where the optical shutter is activated, and shields the external image to prevent the same from being transmitted to the head mounted display apparatus, and now the head mounted display apparatus works in the second time interval. The sub-frame periods SF1~SFN+1 are equal to one frame period F1.

Based on the situation that the head mounted display apparatus periodically provides the display image, the first time interval and the second time interval may sequentially and periodically occur in interleaving manner in a plurality of frame periods.

It should be noted that the sub-frame periods SF1~SFN may be two sub-frame periods, or more than two sub-frame periods, which is not limited by the invention.

Figure 4:
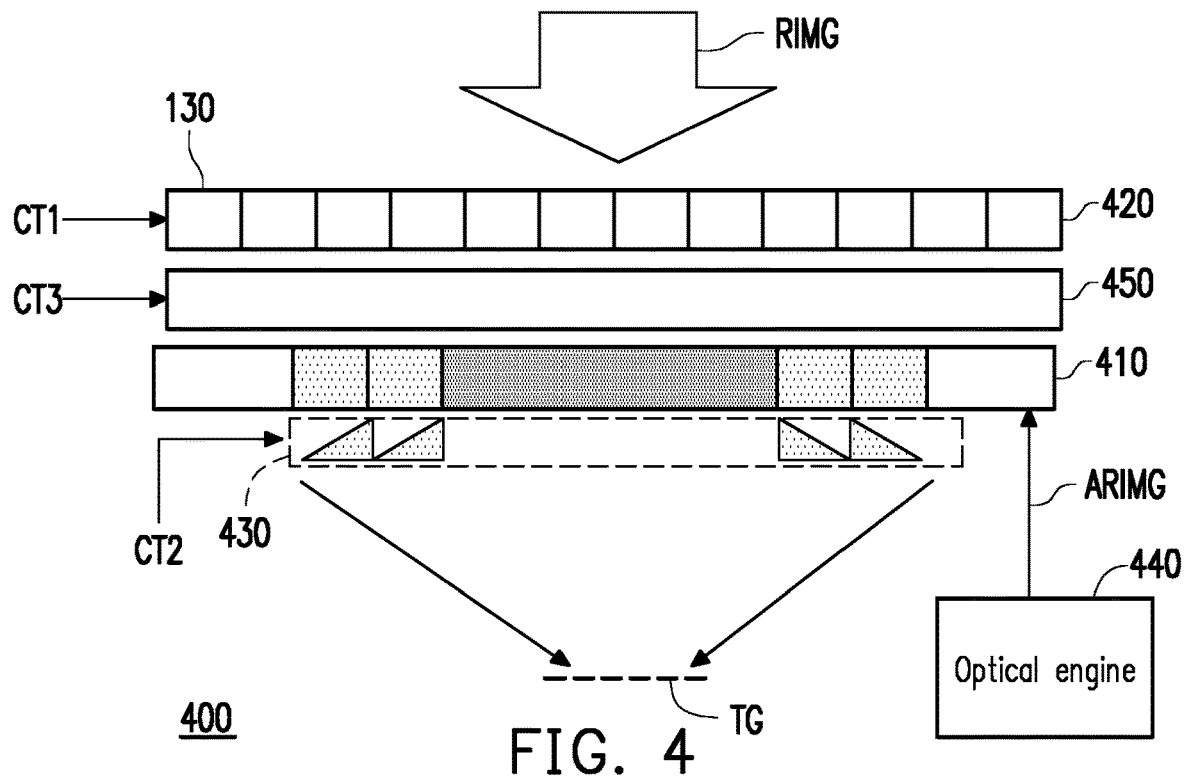
FIG. 4 is a schematic diagram of a head mounted display apparatus according to another embodiment of the invention.

Referring to FIG. 4, FIG. 4 is a schematic diagram of a head mounted display apparatus according to another embodiment of the invention. The head mounted display apparatus 400 includes a display 410, an optical converter 420, an optical shutter 430, an optical engine 440 and an optical compensator 450. Different to the aforementioned embodiment, the head mounted display apparatus 400 further includes the optical compensator 450. The optical compensator 450 is disposed between the display 410 and the optical shutter 430, and is configured to adjust a transmitting angle of the external image RIMG transmitted to the display 410. To be specific, when the optical shutter 430 is not activated, the external image RIMG may be transmitted to the optical compensator 450. In order to receive the external image RIMG of a larger range, the optical compensator 450 may change the transmitting angle of the external image RIMG to effectively transmit the external image RIMG of the larger range to the display 410. In this way, the user may view the external image RIMG of the larger range to effectively expand a viewing angle.

On the other hand, the optical compensator 450 is controlled by an eclectic signal CT3, and controls a deflection angle of the external image RIMG according to the electric signal CT3.

In other embodiments, configuration positions of the optical compensator 450 and the optical shutter 430 may be exchanged, which is not limited by the invention.

It should be noted that in the embodiment of the invention, the optical compensator 450 may be a liquid optical compensator or a liquid crystal optical compensator, and the optical shutter 430 may be a liquid optical shutter, and the optical converter 420 may be a liquid optical converter, a liquid crystal optical converter or an optical converter composed of a plurality of prisms. The display 410 may be a display device produced based on any technique and including a diffractive grating waveguide, a multilayer film polarized reflection waveguide, a semi-transflective optical layer, and a free-form optical layer.

Figure 5:
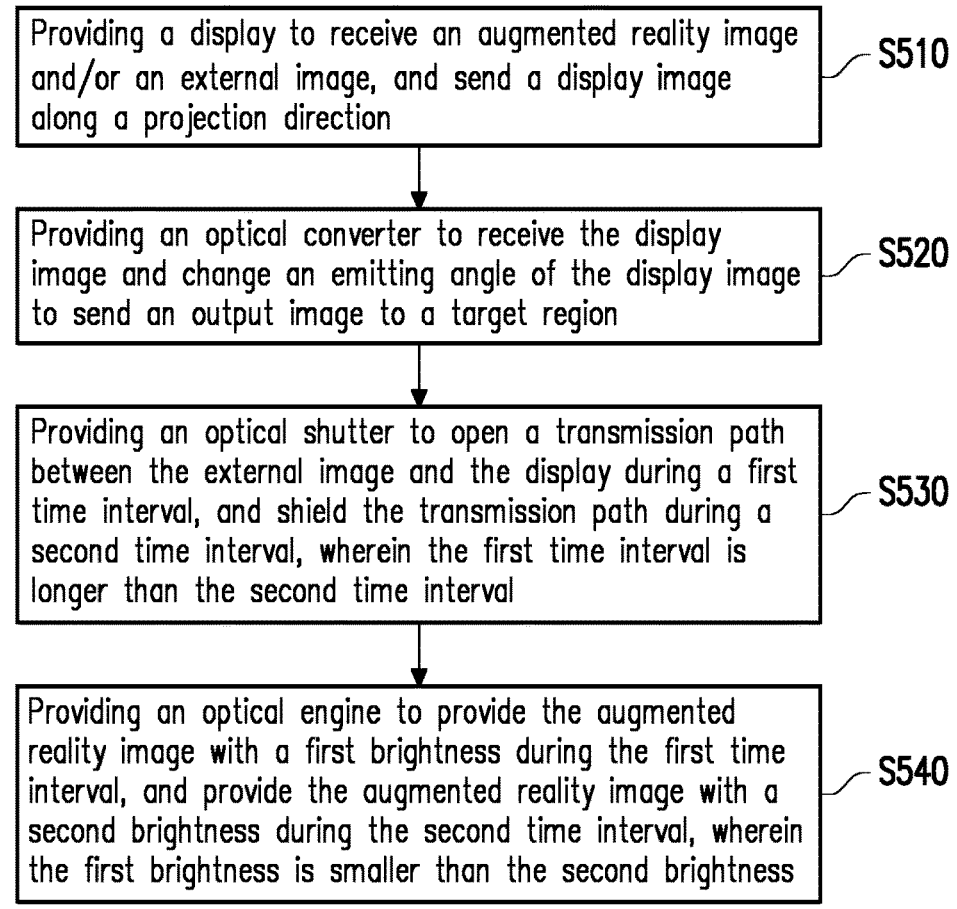
FIG. 5 is a flowchart illustrating an image generating method according to an embodiment of the invention.

Referring to FIG. 5, FIG. 5 is a flowchart illustrating an image generating method according to an embodiment of the invention. The image generating method of FIG. 5 is adapted to the head mounted display apparatus, and includes: providing a display to receive an augmented reality image and/or an external image, and sending a display image along a projection direction (step S510); providing an optical converter to receive the display image and change an emitting angle of the display image to send an output image to a target region (step S520); providing an optical shutter to open a transmission path between the external image and the display during a first time interval, and shield the transmission path during a second time interval, where the first time interval is longer than the second time interval (step S530); and providing an optical engine to provide the augmented reality image with a first brightness during the first time interval, and provide the augmented reality image with a second brightness during the second time interval, wherein the first brightness is smaller than the second brightness (S540).

Implementation details of the above steps have been described in detail in the aforementioned embodiments, which are not repeated.

In summary, the frame period is divided into the relatively longer first time interval and the relatively shorter second time interval. During the first time interval, the optical shutter is not activated, and the optical engine provides the augmented reality image with relatively lower brightness, and during the second time interval, the optical shutter is activated, and the optical engine provides the augmented reality image with relatively higher brightness. In this way, the penetration brightness of the real image may be enhanced, and the display brightness of the augmented reality image is maintained, which effectively improves display performance of the head mounted display apparatus.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A head mounted display apparatus, comprising:
a display, receiving an augmented reality image and/or an external image, and sending a display image along a projection direction;
an optical converter, disposed at a first side of the display, and receiving the display image and changing an emitting angle of the display image to send an output image to a target region;
an optical shutter, disposed at a second side of the display, and configured to shield a transmission path between the external image and the display; and
an optical engine, sending the augmented reality image to the display,
wherein the optical shutter opens the transmission path during a first time interval, and shields the transmission path during a second time interval; the first time interval is longer than the second time interval; a first brightness of the augmented reality image provided by the optical engine during the first time interval is smaller than a second brightness of the augmented reality image provided by the optical engine during the second time interval,
wherein a time length ratio of the first time interval and the second time interval is N:1, a ratio of the second brightness and the first brightness is N:1, and N is a positive integer greater than 1.

2. The head mounted display apparatus as claimed in claim 1, further comprising:
an optical compensator, disposed at the second side of the display, and configured to adjust a transmitting angle of the external image.

3. The head mounted display apparatus as claimed in claim 2, wherein the optical compensator is a liquid optical compensator or a liquid crystal optical compensator.

4. The head mounted display apparatus as claimed in claim 1, wherein a frame period comprises N+1 sub-frame periods, a time length of the first time interval is equal to N sub-frame periods, and a time length of the second time interval is equal to one sub-frame period.

5. The head mounted display apparatus as claimed in claim 1, wherein the first time interval and the second time interval periodically occur in interleaving manner.

6. The head mounted display apparatus as claimed in claim 1, wherein in the first time interval, the display combines the augmented reality image and the external image to generate the display image; in the second time interval, the display only transmits the augmented reality image to generate the display image.

7. The head mounted display apparatus as claimed in claim 1, wherein the optical shutter is a liquid optical shutter.

8. The head mounted display apparatus as claimed in claim 1, wherein the optical converter is a liquid optical converter, a liquid crystal optical converter or an optical converter composed of a plurality of prisms.

9. An image generating method, adapted to a head mounted display apparatus, comprising:
providing a display to receive an augmented reality image and/or an external image, and sending a display image along a projection direction;
providing an optical converter to receive the display image and change an emitting angle of the display image to send an output image to a target region;
providing an optical shutter to open a transmission path between the external image and the display during a first time interval, and to shield the transmission path during a second time interval; wherein the first time interval is longer than the second time interval; and
providing an optical engine to provide the augmented reality image with a first brightness during the first time interval, and to provide the augmented reality image with a second brightness during the second time interval; wherein the first brightness is smaller than the second brightness,
wherein a time length ratio of the first time interval and the second time interval is N:1, a ratio of the second brightness and the first brightness is N:1, and N is a positive integer greater than 1.

10. The image generating method as claimed in claim 9, wherein a frame period comprises N+1 sub-frame periods, a time length of the first time interval is equal to N sub-frame periods, and a time length of the second time interval is equal to one sub-frame period.

11. The image generating method as claimed in claim 9, wherein the first time interval and the second time interval periodically occur in interleaving manner.

12. The image generating method as claimed in claim 9, further comprising:
  providing an optical compensator to adjust a transmitting angle of the external image.

13. The image generating method as claimed in claim 9, wherein the step of providing the display to receive the augmented reality image and/or the external image, and sending the display image along the projection direction comprises:
  in the first time interval, making the display to combine the augmented reality image and the external image to generate the display image; and
  in the second time interval, making the display to only transmit the augmented reality image to generate the display image.

\* \* \* \* \*